US010633029B1

United States Patent
Nusier et al.

(10) Patent No.: US 10,633,029 B1
(45) Date of Patent: Apr. 28, 2020

(54) VEHICLE ROCKER BEAM

(71) Applicant: Ford Global Technologies, LLC, Dearborn, MI (US)

(72) Inventors: Saied Nusier, Canton, MI (US); Mohamed Ridha Baccouche, Ann Arbor, MI (US); Saeed David Barbat, Novi, MI (US); Mahmoud Yousef Ghannam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 28 days.

(21) Appl. No.: 16/157,482

(22) Filed: Oct. 11, 2018

(51) Int. Cl.
  *B62D 21/15* (2006.01)
  *B62D 25/02* (2006.01)
  *B62D 21/04* (2006.01)

(52) U.S. Cl.
  CPC ........... *B62D 21/04* (2013.01); *B62D 21/157* (2013.01); *B62D 25/025* (2013.01); *B62D 21/15* (2013.01)

(58) Field of Classification Search
  CPC ...... B62D 21/04; B62D 21/15; B62D 21/157; B62D 25/025; B60R 19/18; B60R 2019/1806; B60R 2019/182; B60R 2019/1866
  USPC .............................. 296/187.12, 209; 293/102
  See application file for complete search history.

(56) References Cited

U.S. PATENT DOCUMENTS

| 9,533,642 B2 | 1/2017 | Hundley et al. |
| 9,821,854 B2 * | 11/2017 | Bach .................... B62D 25/025 |
| 2009/0026799 A1 | 1/2009 | Gavrilov |
| 2017/0144706 A1 * | 5/2017 | Bach .................... B62D 25/025 |
| 2017/0210426 A1 * | 7/2017 | Gao ..................... B62D 21/157 |
| 2017/0233008 A1 | 8/2017 | Otsuka et al. |
| 2019/0118868 A1 * | 4/2019 | Kellner ................ B62D 25/025 |
| 2019/0248418 A1 * | 8/2019 | Sono ..................... B62D 21/15 |
| 2019/0248419 A1 * | 8/2019 | Mukaigawa ........... B62D 25/20 |

FOREIGN PATENT DOCUMENTS

WO        2016148635  A1     9/2016

OTHER PUBLICATIONS

Fu et al., "A novel auxetic honeycomb with enhanced in-plane stiffness and buckling strength", Composite Structures, 160, 2017, www.elsevier.com/locate/compstruct.

* cited by examiner

*Primary Examiner* — Gregory A Blankenship
(74) *Attorney, Agent, or Firm* — David Coppiellie; Bejin Bieneman PLC

(57) ABSTRACT

A vehicle includes a beam having an inboard panel and an outboard panel. The vehicle includes a first rib extending from the inboard panel to the outboard panel and including a first bend and a second bend. The vehicle includes a second rib extending transversely from the first rib at the first bend. The vehicle includes a third rib extending transversely from the first rib at the first bend and opposite the second rib.

20 Claims, 5 Drawing Sheets

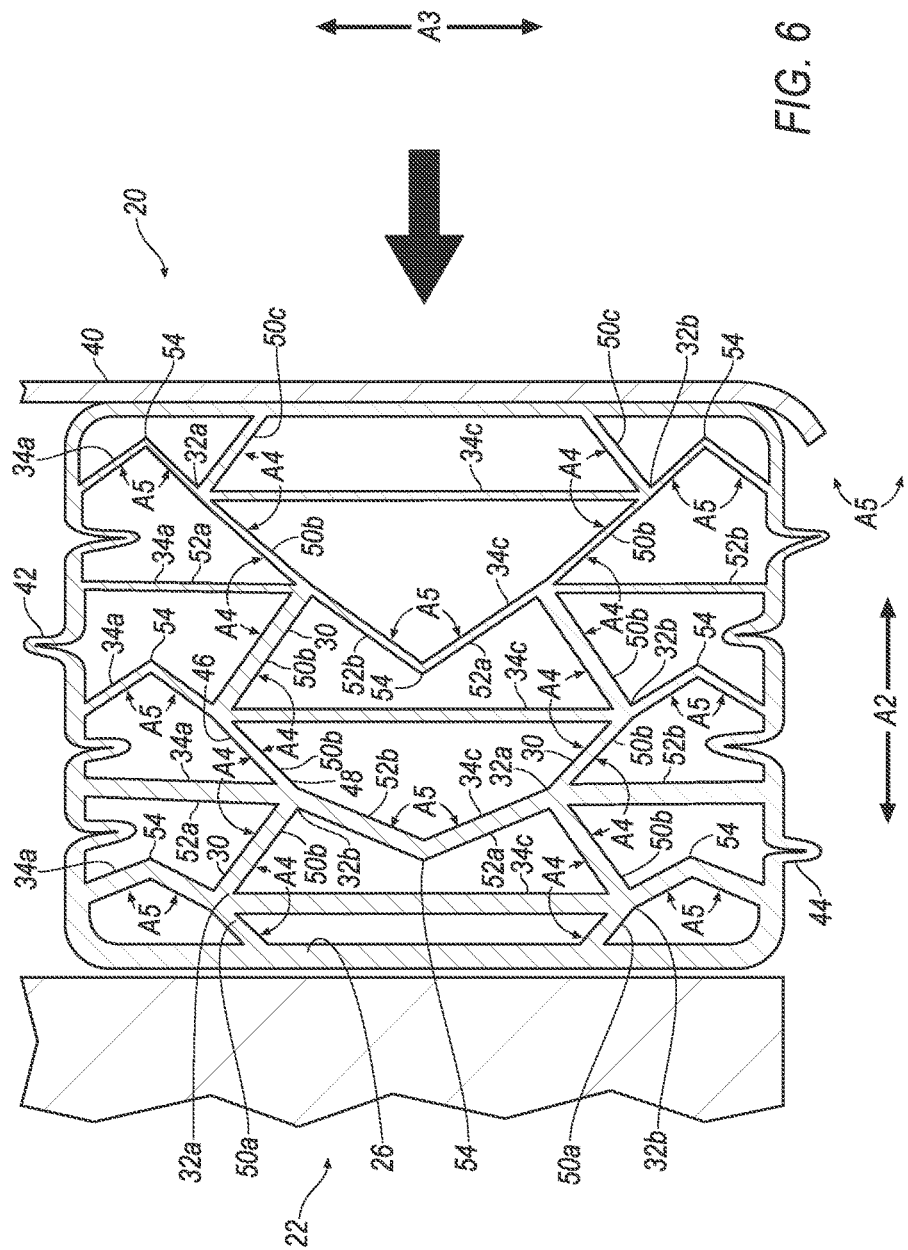

VEHICLE ROCKER BEAM

BACKGROUND

A vehicle includes a rocker assembly. The rocker assembly is typically the lowest portion of a side of a body of the vehicle between tires of the vehicle. The rocker assembly extends along a vehicle-longitudinal axis. The rocker assembly may support a door of the vehicle in a closed position. The rocker assembly may include a step to ease entry and egress to and from the vehicle. The rocker assembly may deform upon application of sufficient force, e.g., during a vehicle side impact.

BRIEF DESCRIPTION OF THE DRAWINGS

FIG. 6 is a cross-section of the example rocker beam of FIG. 5 with a force applied.

DETAILED DESCRIPTION

Figure 1:
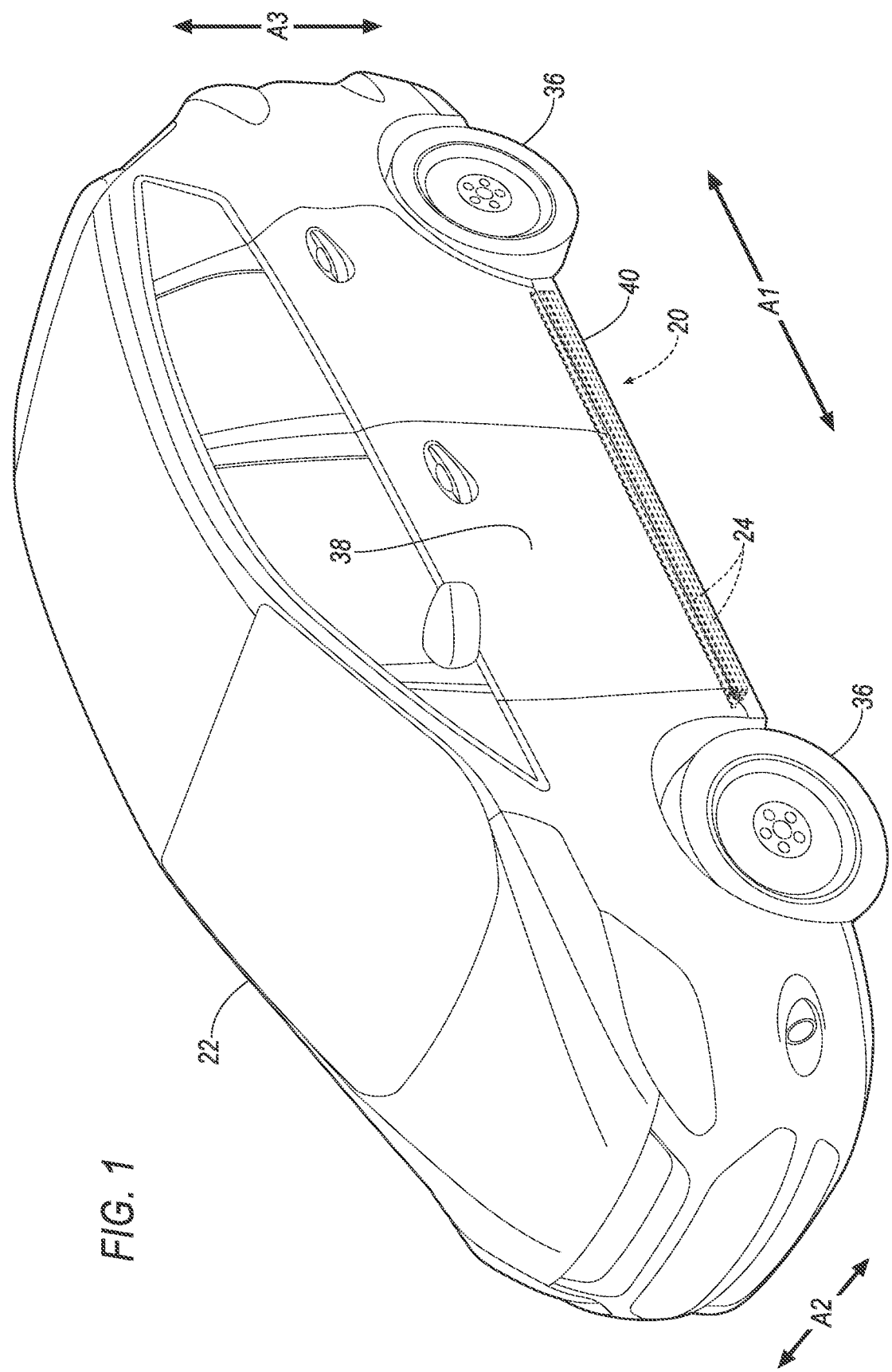
FIG. 1 is a perspective view of a vehicle having a rocker assembly.
Figure 2:
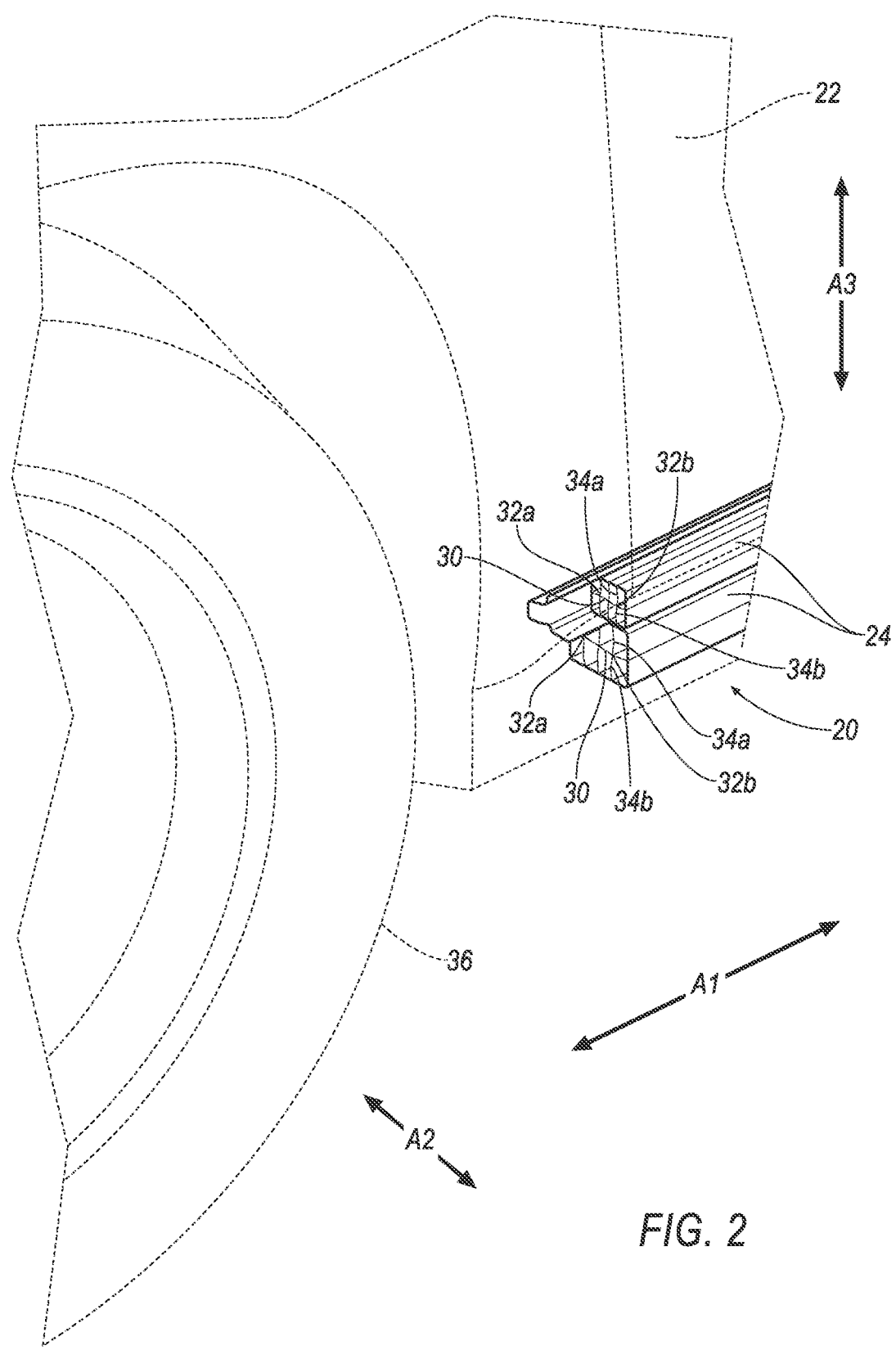
FIG. 2 is a perspective view of the vehicle having the rocker assembly.
Figure 3:
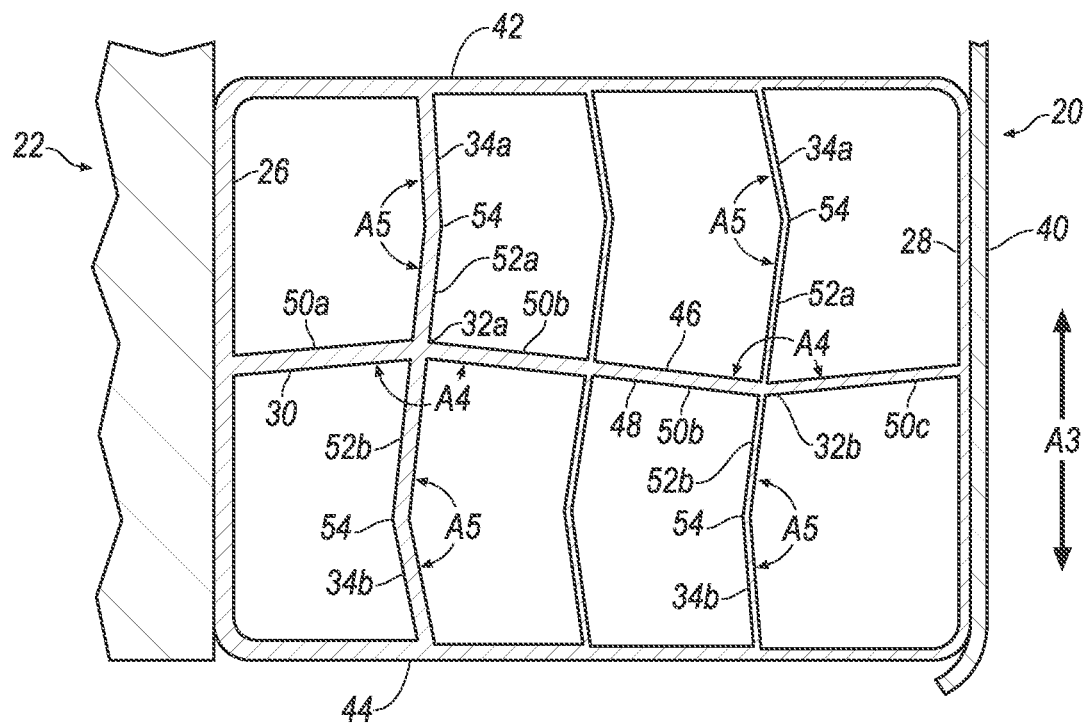
FIG. 3 is a cross-section of an example of a rocker beam of the rocker assembly.

A vehicle includes a beam having an inboard panel and an outboard panel. The vehicle includes a first rib extending from the inboard panel to the outboard panel and including a first bend and a second bend. The vehicle includes a second rib extending transversely from the first rib at the first bend. The vehicle includes a third rib extending transversely from the first rib at the first bend and opposite the second rib.

The second rib and the third rib may be parallel.

The vehicle may include a fourth rib extending transversely from the first rib at the second bend, and a fifth rib extending transversely from the first rib at the second bend and opposite the fourth rib.

The vehicle may include a fourth rib extending from the inboard panel to the outboard panel and having a bend, the second rib extending to the fourth rib at the bend.

The fourth rib may include a second bend, and the vehicle may include a fifth rib extending from the second bend of the first rib to the second bend of the fourth rib.

A distance from the first bend of the first rib to the bend of the fourth rib may be greater than a distance from the second bend of the first rib to the second bend of the fourth rib.

The first bend of the first rib may be aligned with the bend of the fourth rib along a vehicle-vertical axis.

The beam may be a component of a rocker assembly.

The inboard panel and the outboard panel may be spaced from each other along a cross-vehicle axis.

The first rib may be thicker at the inboard panel than at the outboard panel.

The vehicle may include a door above the beam.

The beam may be elongated along a vehicle-longitudinal axis.

The beam, the first rib, the second rib, and the third rib may be monolithic.

The beam may include a top panel and a bottom panel, the second rib extending to the top panel and the third rib extending to the bottom panel.

A rocker beam includes a first panel and a second panel elongated along a first axis and spaced from the first panel along a second axis perpendicular to the first axis. The rocker beam includes a first rib extending from the first panel to the second panel and including a first bend and a second bend. The rocker beam includes a second rib extending transversely from the first bend. The rocker beam includes a third rib extending transversely from the first bend opposite the second rib.

The first rib may include a first portion between the first panel and the first bend, and a second portion thinner than the first portion and between the first bend and the second bend.

The first rib may include a third portion thinner than the second portion and between the second bend and the second panel.

The second rib may include a bend.

The rocker beam may include a third panel extending from the first panel to the second panel, the second rib extending to the third panel.

The rocker beam may include a fourth panel extending from the first panel to the second panel, the third rib extending to the fourth panel.

With reference to the Figures, wherein like numerals indicate like parts throughout the several views, a rocker assembly 20, 120 for a vehicle 22 includes a rocker beam 24 having an inboard panel 26 and an outboard panel 28. The rocker beam 24 includes a main rib 30 extending from the inboard panel 26 to the outboard panel 28. The rocker beam includes a plurality of bends, e.g., a top bend 32a and a bottom bend 32a, 32b. The rocker beam 24 includes a pair of support ribs transversely from the main rib 30 opposite each other at one of the bends 32a, 32b, e.g., a support rib 34a extending from the main rim 30 to a top panel 42, and a support rib 34b extending from the main rib 30 to a bottom panel 44 or a support rib 34c extending from the main rib 30 to another main rib 30. The arrangement of the main rib 30 and the support ribs 34a, 34b, 34c absorbs energy during a vehicle impact, e.g., deformation of the main rib 30 at the bend 32a, 32b may create tension stress in one of the support ribs 34a, 34b, 34c and compression stress in the other support rib 34a, 34b, 34c.

In the following description, relative orientations and direction (by way of example, top, bottom, front, rear, outboard, inboard, inward, outward, lateral, left, right) are from the perspective of an occupant seated in a seat, facing a dashboard of the vehicle 22. Orientation and direction relative to the rocker assembly 20, 120 are given related to when the rocker assembly 20, 120 is supported by the vehicle 22 as described below and shown in the Figures.

The vehicle 22 may be any type of passenger or commercial automobile such as a car, a truck, a sport utility vehicle, a crossover vehicle, a van, a minivan, a taxi, a bus, etc.

The vehicle 22 may define a longitudinal axis A1, e.g., extending between a front and a rear of the vehicle 22. The vehicle 22 may define a cross-vehicle axis A2, e.g., extending between a left side and a right side of the vehicle 22. The vehicle 22 may define a vertical axis A3, e.g., extending between a top and a bottom of the vehicle 22. The longitudinal axis A1, the cross-vehicle axis A2, and the vertical axis A3 may be perpendicular to each other.

The vehicle 22 may include a body and a frame. The body and frame may be of a unibody construction. In the unibody construction, the body, e.g., rocker beams 24, pillars, roof rails, etc., serves as the vehicle frame, and the body is unitary, i.e., a continuous one-piece unit. As another example, the body and frame may have a body-on-frame construction (also referred to as a cab-on-frame construction). In other words, the body and frame are separate components, i.e., are modular, and the body is supported on and affixed to the frame. Alternatively, the body and frame may have any suitable construction. The body and/or the frame may be formed of any suitable material, for example, steel, aluminum, etc.

The vehicle 22 may include a door 38. The door 38 may be fixed to the body of the vehicle 22. The door 38 may move between an open position and a closed position. The door 38 in the open position permits entry and egress to and from the vehicle 22. The door 38 in the closed position may inhibit entry and egress to and from the vehicle 22. The door 38 may be above the rocker assembly 20, 120, e.g., the rocker beam 24, along to the vertical axis A3. In other words, the door 38 may be between the rocker beam 24 and a roof of the vehicle 22.

The rocker assembly 20, 120 is the lowest portion of a side of the vehicle 22. The rocker assembly 20, 120 extends along the longitudinal axis A1, e.g., between wheels 36 of the vehicle 22. The rocker assembly 20, 120 may support the door 38 in the closed position. The rocker assembly 20, 120 may include a step to ease entry and egress to and from the vehicle 22.

The rocker assembly 20, 120 may include a rocker panel 40. The rocker panel 40 may include a class-A surface, i.e., i.e., a surface specifically manufactured to have a high quality, finished aesthetic appearance free of blemishes. The rocker panel 40 may be outboard of the rocker beam 24.

Figure 4:
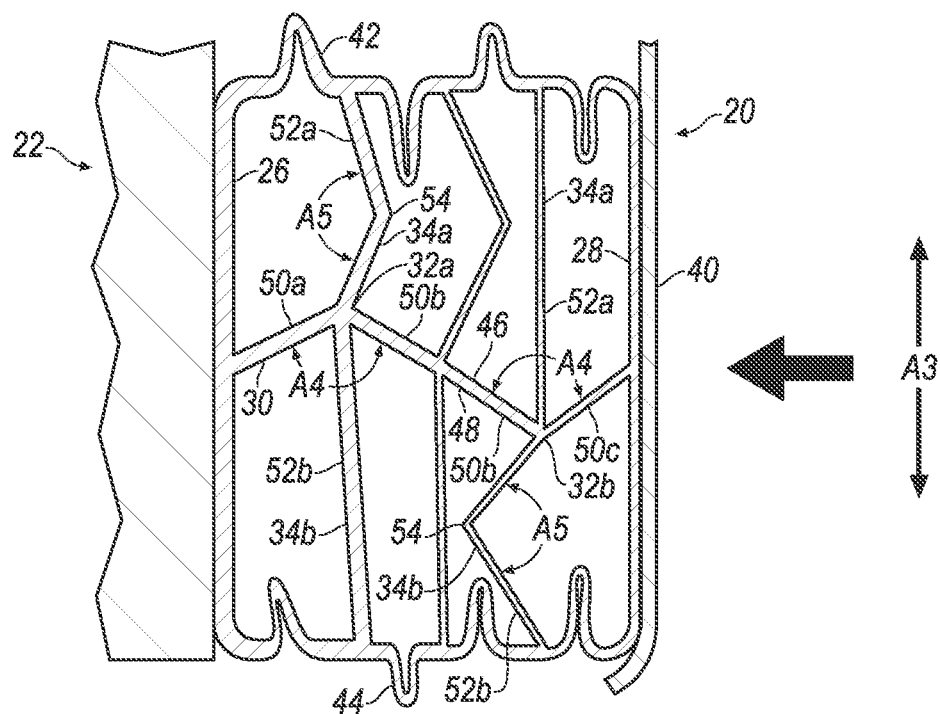
FIG. 4 is a cross-section of the example rocker beam of FIG. 3 with a force applied.

The rocker assembly 20, 120 may include one or more rocker beams 24. One rocker beam 20, 120 may be above another rocker beam 24. The rocker beam 24 absorbs energy, e.g., when a force F is applied transverse to the longitudinal axis A1 during a vehicle impact, as shown in FIGS. 4 and 6. The rocker beam 24 may be a component of the rocker assembly 20, 120. The rocker beam 24 is elongated along the longitudinal axis A1, e.g., between the wheels 36 of the vehicle 22.

The rocker beam 24 has the inboard panel 26 and the outboard panel 28. The inboard panel 26 and the outboard panel 28 are elongated along the longitudinal axis A1. The inboard panel 26 and the outboard panel 28 are spaced from each other along the cross-vehicle axis A2. The inboard panel 26 is inboard of the outboard panel 28. In other words, the inboard panel 26 is between the outboard panel 28 and a longitudinally extending center line of the vehicle 22, e.g., along the cross-vehicle axis A2. The rocker beam 24 may be metal or any other suitable crushable material.

The rocker beam 24 may include the top panel 42 and the bottom panel 44. The top panel 42 may be spaced from the bottom panel 44, e.g., along the vertical axis A3. The top panel 42 and the bottom panel 44 may be elongated along the longitudinal axis A1. The top panel 42 and the bottom panel 44 may extend between the inboard panel 26 and outboard panel 28. The top panel 42 may be fixed to the inboard panel 26 and/or the outboard panel 28, e.g., via welding, etc. The bottom panel 44 may be fixed to the inboard panel 26 and/or the outboard panel 28. The top panel 42, the bottom panel 44, the inboard panel 26, and/or the outboard panel 28 may be monolithic, i.e., a single piece of material with no seams, joints, fasteners, or adhesives holding the top panel 42, the bottom panel 44, the inboard panel 26, and/or the outboard panel 28 together.

The top panel 42 and/or bottom panel 44 may be thicker at the inboard panel 26 than at the outboard panel 28. For example, the top panel 42 and/or bottom panel 44 may taper as the top panel 42 and/or bottom panel 44 extends from the inboard panel 26 to the outboard panel 28, e.g., a distance between a top surface and a bottom surface of the top panel 42 and/or distance between a top surface and a bottom surface of the bottom panel 44 may decrease as the top panel 42 and/or bottom panel 44 extends from the inboard panel 26 to the outboard panel 28.

The rocker beam 24 includes one or more main ribs 30. The main rib 30 deforms to absorb energy and transfers energy to the support ribs 34a, 34b, 34c. The main rib 30 extends from the inboard panel 26 to the outboard panel 28. The main rib 30 may be elongated along the longitudinal axis A1, e.g., be longer along the longitudinal axis A1 than along the cross-vehicle axis A2 or the vertical axis A3. The main rib 30 may be fixed to the inboard panel 26 and/or the outboard panel 28. The main rib 30, the inboard panel 26, and/or the outboard panel 28 may be monolithic.

The main rib 30 may include a top surface 46 and a bottom surface 48. The top surface 46 may be opposite the bottom surface 48. The top surface 46 may be between the bottom surface 48 and the top panel 42. The bottom surface 48 may be between the top surface 46 and the bottom panel 44.

The main rib 30 includes one or more bends 32a, 32b. Each of the bends 32a, 32b may define an angle A4, e.g., between respective portions 50a, 50b, 50c on opposite sides of each bend 32a, 32b. The angles A4 may be obtuse.

The main rib 30 may include a plurality of the portions 50a, 50b, 50c. One portion 50a may be between the inboard panel 26 and one of the bends 32a, 32b. One portion 50b may be between the bends 32a, 32b, e.g., with one bend 32a on one end of the portion 50b and another bend 32b at an opposite end of the portion 50b. One portion 50c may be may be between the outboard panel 28 and one of the bends 32a, 32b.

The main rib 30 may be thicker at the inboard panel 26 than at the outboard panel 28. For example, the portion 50b between the bends 32a, 32b may be thinner than the portion 50a between one of the bends 32a, 32b and the inboard panel 26, e.g., a distance between the top surface 46 and the bottom surface 48 of the portion 50b between the bends 32a, 32b may be less than a distance between the top surface 46 and the bottom surface 48 of the portion 50a between one of the bends 32a, 32b and the inboard panel 26. For example, the portion 50b between the bends 32a, 32b may have a thickness in the range of 2.7 to 3.0 millimeters, and the portion 50a between one of the bends 32a, 32b and the inboard panel 26 may have a thickness of 3.6 millimeters. The portion 50c between the outboard panel 28 and one of the bends 32a, 32b may be thinner than the portion 50b between the bends 32a, 32b, e.g., a distance between the top surface 46 and the bottom surface 48 of the portion 50c between one of the bends 32a, 32b and the outboard panel 28 may be less than the distance between the top surface 46 and the bottom surface 48 of the portion 50b between the bends 32a, 32b. For example, the portion 50c between one of the bends 32a, 32b and the outboard panel 28 may have a thickness of 2.4 millimeters. As another example, the main rib 30 may taper as the main rib 30 extends from the inboard panel 26 to the outboard panel 28, e.g., a distance between the top surface 46 and the bottom surface 48 may decrease as the main rib 30 extends from the inboard panel 26 to the outboard panel 28 (not shown).

Each main rib 30 has top bends 32a and bottom bends 32b. The top bends 32a may be above the bottom bends 32b, e.g., relative to the vertical axis A3. In other words, the top bends 32a of one of the main ribs 30 may between the top panel 42 and the bottom bends 32b of such main rib 30, and the bottom bends 32b may be between the bottom panel 44 the top bends 32a.

The bends 32a, 32b of one of the main ribs 30 may be aligned with the bends 32a, 32b of another of the main ribs 30 along the vertical axis A3. For example, a distance along the cross-vehicle axis A2 from the inboard panel 26 to the bend 32a, 32b closest the inboard panel 26 of one of the main ribs 30 may be the same as a distance from the inboard panel 26 to the bend 32a, 32b closest the inboard panel 26 of another of the main ribs 30. The top bends 32a of one main rib 30 may be vertically aligned with the bottom bends 32b of the other main rib 30.

Figure 5:
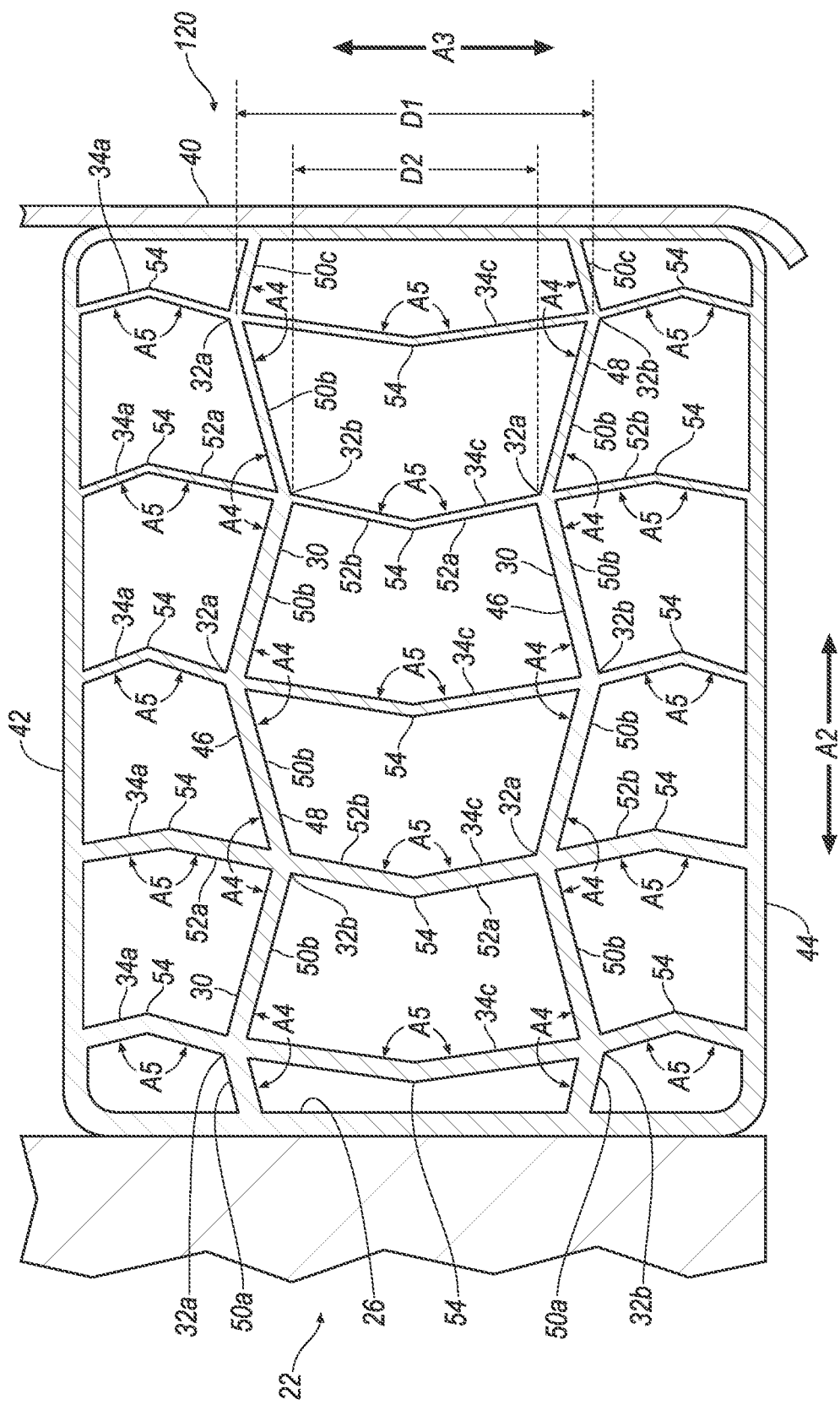
FIG. 5 is a cross-section of another example of a rocker beam of the rocker assembly.

With reference to the rocker assembly 120 shown FIGS. 5 and 6, one of the bends 32a, 32b of one of the main ribs 30 and one of the bends 32a, 32b of another main rib 30 may be spaced by a first distance D1. Another of the bends 32a, 32b of one the main ribs 30 and another of the bends 32a, 32b of the other main rib 30 may be spaced by a second distance D2. The first distance D1 may be greater than the second distance D2. For example, the first distance D1 may be between one of the top bends 32a and the bottom bend 32b that is vertically aligned thereunder, and the second distance D2 may be between one of the bottom bends 32b and the top bend 32a that is vertically aligned thereunder Returning to the rocker assembly 20, 120 shown through the Figures, the support ribs 34a, 34b, 34c deform and absorb energy from the main ribs 30, e.g., when the main ribs 30 are deformed during a vehicle impact. One support rib 34a, 34b, 34c extends transversely from one of the main ribs 30 at one of the bends 32a, 32b, and another support rib 34a, 34b, 34c extends transversely from such main rib 30 at such bend 32a, 32b and opposite the first referenced support rib 34a, 34b, 34c. In other words, one support rib 34a, 34b, 34c may extend transversely from the top surface 46 of the of the main ribs 30 at one of the bends 32a, 32b, and another support rib 34a, 34b, 34c may extend transversely from the bottom surface 48 of such main rib 30 at such bend 32a, 32b. The rocker assembly 20, 120 may be free of additional support ribs extending from the bends 32a, 32b. In other words, only two support ribs 34a, 34b, 34c may extend from each bend 32a, 42b. The rocker beam 24, the main ribs 30, and/or the support ribs 34a, 34b, 34c may be monolithic.

One or more support ribs 34a may extend to the top panel 42. For example, the support ribs 34a may extend generally upwardly from the top surface 46 of one of the main ribs 30 at each of the bends 32a, 32b to the top panel 42.

One or more support ribs 34b may extend to the bottom panel 44. For example, the support ribs 34b may extend generally downwardly from the bottom surface 48 of one of the main ribs 30 at each of the bends 32a, 32b to the bottom panel 44.

With reference to the rocker assembly 120 shown FIGS. 5 and 6, the support ribs 34c may extend between main ribs 30. For example, one of the support ribs 34c may extend from the top surface 46 of one of the main ribs 30 at one of the bends 32a, 32b to the bottom surface 48 of another main rib 30 at one of the bends 32a, 32b. The support ribs 34c may extend from top bend 32a of one the main ribs 30 to the bottom bends 32b of another main rib 30. The support ribs 34c may extend from the bottom bend 32b of one the main ribs 30 to the top bends 32a of another main rib 30.

Returning to the rocker assembly 20, 120 shown through the Figures, portions 52a, 52b of two or more of the support ribs 34a, 34b, 34c may be parallel with each other. For example, the portion 52a of the support rib 34a, 34b, 34c extending from the top surface 46 of one of the main ribs 30 at one of the bends 32a, 32b may be parallel with the portion 52b of the support rib 34a, 34b, 34c extending from the bottom surface 48 of such main rib 30 at such bend 32a, 32b. Additionally, and/or alternately, portions 52a, 52b of two or more of the support ribs 34a, 34b, 34c may be other than parallel.

Each of the support ribs 34a, 34b, 34c may include a bend 54. The bends 54 in the support ribs 34a, 34b, 34c provide stress concentration areas to control deformation of the support ribs 34a, 34b, 34c. For example, an angle A5 of the bends 54 may change during a vehicle impact as a distance between ends of the support rib 34a, 34b, 34c changes. The angle A5 of the bends 54 of the support ribs 34a, 34b, 34c may be obtuse.

The support ribs 34a, 34b, 34c that are closer to the inboard panel 26 may be thicker than the support ribs 34a, 34b, 34c that are closer to the outboard panel 28. For example, the support ribs 34a, 34b, 34c extending from the bend 32a, 32b at an inboard end of the portion 50c of the main rib 30 that extends from the outboard panel 28 may have a thickness of 2.1 mm, and the support ribs 34a, 34b, 34c extending from the bend 32a, 32b at an outboard end of the portion 50a of the main rib 30 that extends from the inboard panel 26 may a thickness of 3.6 mm. The thickness may be a distance between inboard and outboard surfaces of the support ribs 34a, 34b, 34c.

With reference to FIGS. 4 and 6, a force F applied transverse to the longitudinal axis A1, e.g., during a vehicle impact, causes deformation as the rocker assembly 20, 120 absorbs energy. The force F may cause the main ribs 30 to fold, e.g., in an accordion-like manner. For example, the top bends 32a of each main rib 30 may move closer together, the bottom bends 32b of each main rib 30 may move closer together, the angles A4 defined by the bends 32a, 32b may decrease, etc. As the main ribs 30 deform, the top bends 32a may move toward the top panel 42 and the bottom bends 32b may move toward the bottom panel 44. Movement of the bends 32a, 32b creates tension or compression in the support ribs 34a, 34b, 34c. For example, the support ribs 34b between bottom bends 32b and the bottom panel 44, the support ribs 34c between the bottom surface 48 at the bottom bends 32b and the top surface 46 at the top bends 32a, and the support ribs 34a between the top bends 32a and the top panel 42 are compressed upon application of the force F. The angle A5 of the bends 54 of the support ribs 34a, 34b, 34c that are compressed may decrease. As another example, the support ribs 34c between top bends 32a and the bottom panel 44, the support ribs 34c between the bottom surface 48 at the top bends 32a and the top surface 46 at the bottom bends 32b, and the support ribs 34a between the bottom bends 32b and the top panel 42 are expand, e.g., in tension, upon application of the force F. The angle A5 of the bends 54 of the support ribs 34a, 34b, 34c that are expanded may increase. Deformation of the rocker assembly 20, 120 as described above provides efficient absorption of energy, e.g., by distributing the absorbed energy among the main ribs 30 and the support ribs 34a, 34b, 34c, and helps to limit deformation along the cross-vehicle axis A2, e.g., by enabling controlled deformation along the vertical axis A3, e.g., by deformation of the support ribs 34a, 34b, 34c when they are placed in compression or tension along the vertical axis A3.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle, comprising:
a beam having an inboard panel and an outboard panel;
a first rib extending from the inboard panel to the outboard panel and including a first bend and a second bend;
a second rib extending transversely from the first rib at the first bend; and
a third rib extending transversely from the first rib at the first bend and opposite the second rib.

2. The vehicle of claim 1, wherein the second rib and the third rib are parallel.

3. The vehicle of claim 1, further comprising a fourth rib extending transversely from the first rib at the second bend, and a fifth rib extending transversely from the first rib at the second bend and opposite the fourth rib.

4. The vehicle of claim 1, further comprising a fourth rib extending from the inboard panel to the outboard panel and having a bend, the second rib extending to the fourth rib at the bend.

5. The vehicle of claim 4, wherein the fourth rib includes a second bend, and further comprising a fifth rib extending from the second bend of the first rib to the second bend of the fourth rib.

6. The vehicle of claim 5, wherein a distance from the first bend of the first rib to the bend of the fourth rib is greater than a distance from the second bend of the first rib to the second bend of the fourth rib.

7. The vehicle of claim 4, wherein the first bend of the first rib is aligned with the bend of the fourth rib along a vehicle-vertical axis.

8. The vehicle of claim 1, wherein the beam is a component of a rocker assembly.

9. The vehicle of claim 1, wherein the inboard panel and the outboard panel are spaced from each other along a cross-vehicle axis.

10. The vehicle of claim 1, wherein the first rib is thicker at the inboard panel than at the outboard panel.

11. The vehicle of claim 1, further comprising a door above the beam.

12. The vehicle of claim 1, wherein the beam is elongated along a vehicle-longitudinal axis.

13. The vehicle of claim 1, wherein the beam, the first rib, the second rib, and the third rib are monolithic.

14. The vehicle of claim 1, wherein the beam includes a top panel and a bottom panel, the second rib extending to the top panel and the third rib extending to the bottom panel.

15. A rocker beam, comprising:
a first panel and a second panel elongated along a first axis and spaced from the first panel along a second axis perpendicular to the first axis;
a first rib extending from the first panel to the second panel and including a first bend and a second bend;
a second rib extending transversely from the first bend; and
a third rib extending transversely from the first bend opposite the second rib.

16. The rocker beam of claim 15, wherein the first rib includes a first portion between the first panel and the first bend, and a second portion thinner than the first portion and between the first bend and the second bend.

17. The rocker beam of claim 16, wherein the first rib includes a third portion thinner than the second portion and between the second bend and the second panel.

18. The rocker beam of claim 15, wherein the second rib includes a bend.

19. The rocker beam of claim 15, further comprising a third panel extending from the first panel to the second panel, the second rib extending to the third panel.

20. The rocker beam of claim 19, further comprising a fourth panel extending from the first panel to the second panel, the third rib extending to the fourth panel.

* * * * *